United States Patent
Winkler (10) Patent No.: US 10,453,347 B2
(45) Date of Patent: Oct. 22, 2019

(54) METHOD AND SYSTEMS FOR INCREASING CAPACITY AND SAFETY OF AERONAUTICAL SAFETY-OF-LIFE SERVICES AND DATA LINKS

(71) Applicant: THALES ALENIA SPACE ITALIA S.P.A. CON UNICO SOCIO, Rome (IT)

(72) Inventor: Roberto Winkler, Rome (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 0 days.

(21) Appl. No.: 15/770,077

(22) PCT Filed: Jun. 1, 2016

(86) PCT No.: PCT/EP2016/062431
§ 371 (c)(1),
(2) Date: Apr. 20, 2018

(87) PCT Pub. No.: WO2017/067675
PCT Pub. Date: Apr. 27, 2017

(65) Prior Publication Data
US 2018/0315323 A1    Nov. 1, 2018

(30) Foreign Application Priority Data
Oct. 22, 2015    (EP) .................................... 15425087

(51) Int. Cl.
*H04B 7/185*    (2006.01)
*G08G 5/00*    (2006.01)
(Continued)

(52) U.S. Cl.
CPC ......... *G08G 5/0026* (2013.01); *G08G 5/0013* (2013.01); *G08G 5/0021* (2013.01);
(Continued)

(58) Field of Classification Search
CPC .. G08G 5/0026; G08G 5/0013; G08G 5/0021; G08G 5/0095; H04W 4/44;
(Continued)

(56) References Cited

U.S. PATENT DOCUMENTS 7,495,602 B2    2/2009    Sandell et al.
8,220,038 B1    7/2012    Lucchesi et al.
(Continued)

FOREIGN PATENT DOCUMENTS

EP    1995706 A2    11/2008
EP    2023685 A1    2/2009
(Continued)

OTHER PUBLICATIONS

PCT International Search Report and Written Opinion for PCT/EP2016/062431 dated Sep. 15, 2016.

*Primary Examiner* — Md K Talukder
(74) *Attorney, Agent, or Firm* — McCarter & English, LLP (57) ABSTRACT

Disclosed herein is a method for managing aeronautical safety-critical services or data links, comprising: receiving quality measurement data indicative of a quality parameter measured for an aeronautical safety-critical service or data link used by an aircraft; receiving a four-dimensional position associated with the quality measurement data, wherein said four-dimensional position includes a three-dimensional space position and a corresponding time that are computed based on a Global Navigation Satellite System and related to the measured quality parameter; tagging the quality measurement data with the associated four-dimensional position; determining, on the basis of the tagged quality measurement data and of a predefined task policy, a task to be performed, which task includes an adaptation of the aeronautical safety-critical service used by the aircraft or of resources allocated to the aeronautical safety-critical data (Continued)

link used by the aircraft, wherein said adaptation is based on said tagged quality measurement data; and performing the determined task.

6 Claims, 7 Drawing Sheets

(51) Int. Cl.
  *H04L 12/70* (2013.01)
  *H04L 29/00* (2006.01)
  *H04W 4/02* (2018.01)
  *H04L 29/08* (2006.01)
  *H04W 4/44* (2018.01)
  *H04W 72/04* (2009.01)
  *H04W 72/08* (2009.01)
  *H04L 12/26* (2006.01)

(52) U.S. Cl.
  CPC ....... *G08G 5/0095* (2013.01); *H04B 7/18593* (2013.01); *H04L 29/00* (2013.01); *H04L 47/00* (2013.01); *H04L 67/12* (2013.01); *H04W 4/02* (2013.01); *H04W 4/44* (2018.02); *H04W 72/048* (2013.01); *H04W 72/085* (2013.01); *G08G 5/0069* (2013.01); *H04L 43/08* (2013.01)

(58) Field of Classification Search
  CPC ... H04W 4/02; H04W 72/048; H04W 72/085; H04B 7/18593; H04L 29/00; H04L 47/00; H04L 67/12
  See application file for complete search history.

(56) References Cited

U.S. PATENT DOCUMENTS

| | | |
|---|---|---|
| 2002/0133294 A1 | 9/2002 | Farmakis et al. |
| 2004/0236547 A1 | 11/2004 | Rappaport et al. |
| 2006/0178141 A1 | 8/2006 | McGuffin et al. |
| 2009/0070123 A1 | 3/2009 | Wise et al. |
| 2011/0133980 A1 | 6/2011 | Judd et al. |
| 2011/0255506 A1 | 10/2011 | Toth et al. |
| 2014/0003335 A1 | 1/2014 | Roy |
| 2015/0052352 A1 | 2/2015 | Dolev et al. |
| 2015/0222351 A1* | 8/2015 | Judd .................. H04B 7/18506 455/11.1 |
| 2015/0365280 A1* | 12/2015 | Lohrey ............... H04L 41/0806 370/254 |
| 2017/0110018 A1* | 4/2017 | Wang ................... G08G 5/0078 |
| 2018/0150086 A1* | 5/2018 | Nobukawa ............. G08G 1/005 |
| 2018/0295218 A1* | 10/2018 | McGuffin ............... H04L 69/08 |
| 2018/0315323 A1* | 11/2018 | Winkler .................. H04L 67/12 |
| 2018/0366008 A1* | 12/2018 | Dacre-Wright ...... G08G 5/0021 |
| 2019/0052349 A1* | 2/2019 | Russell ............. H04B 7/18504 |

FOREIGN PATENT DOCUMENTS

| | | |
|---|---|---|
| EP | 2667363 A1 | 11/2013 |
| EP | 2109087 A2 | 3/2014 |
| EP | 15425087.2 | 10/2015 |
| EP | 2889579 A1 | 2/2018 |
| WO | WO 2007/064733 A1 | 6/2007 |
| WO | PCT/EP2016/062431 | 6/2016 |
| WO | WO 2017/067675 A1 | 4/2017 |

* cited by examiner

FIG. 6

METHOD AND SYSTEMS FOR INCREASING CAPACITY AND SAFETY OF AERONAUTICAL SAFETY-OF-LIFE SERVICES AND DATA LINKS

CROSS-REFERENCE TO RELATED APPLICATIONS

This application is a 35 U.S.C. § 371 National Stage filing of International Application No. PCT/EP2016/062431, filed on Jun. 1, 2016, which claims priority to European Patent Application 15425087.2, filed on Oct. 22, 2015.

TECHNICAL FIELD OF THE INVENTION

The present invention relates, in general, to aeronautical Safety-of-Life (SoL) applications and, in particular, to a method and related systems for increasing capacity and safety of aeronautical SoL communications, by adapting aeronautical SoL services and/or communication resources of aeronautical SoL data links.

In this connection, it is important to note that in the present document the terms "Safety-of-Life" (and the corresponding acronym SoL) and "safety-critical" are interchangeably used, in combination with the words "applications", "communications", "services" and "data links", to mean aeronautical applications/services/communications/datalinks that are:
  defined as SoL, safety-critical or Safety of Flight (SoF) by international, regional or national aviation authorities/organizations/agencies/associations (such as the International Civil Aviation Organization (ICAO), the International Air Transport Association (IATA), EUROCONTROL (i.e., the European Organization for the Safety of Air Navigation), the European Aviation Safety Agency (EASA), the Federal Aviation Administration (FAA), etc.); and
  based on radiofrequencies (RFs) or RF bands specifically assigned, for example in International Telecommunication Union's (ITU) Radio Regulations, to such SoL, safety-critical or SoF aeronautical applications/services/communications/datalinks.

In this connection, it is important to note also that in the present document the term "aircraft" is used to refer to manned aircraft pertaining to General Avionics or Commercial Avionics, as well as to Remotely Piloted Aircraft and Unmanned Aircraft, in accordance to current strategy towards insertion in the Civilian airspace.

BACKGROUND ART

As is known, safe and efficient exchange of information between entities involved in Air Traffic Management (ATM) is becoming more and more important with the evolution of aeronautical communications procedures and technologies.

Information items have been typically transferred between ground stations and aircraft using Very High Frequency (VHF) and High Frequency (HF) technologies, which are now gradually replaced with the Aircraft Communications Addressing and Reporting System (ACARS) and the Aeronautical Telecommunication Network (ATN), the latter being presently based on Open Systems Interconnection (OSI) protocols and deemed to evolve towards Internet Protocol (IP) suite.

Issues related to coexistence of terrestrial and satellite technologies and to line-of-sight constraints have been overcome, in most cases, assuming profile-based solutions, with primary data link allocations to different airspaces and flight phases also in view of different operational opportunities made available by communications service providers and of different technology availabilities and cost impacts.

Generally, current architectures maintain continuous communications between a ground station and an aircraft by involving a plurality of ground stations to relay signals between the originating ground station and the aircraft, as the latter proceeds along its flight route. This is a rather static approach, in which air-ground communications are routed according to pre-planned paths, involving predefined service providers and associated access points for what refers to the whole ATM value chain, including communications, navigation and surveillance.

This scenario is changing with the evolution of aeronautical communications towards 4D-trajectory-based operation (where 4D stands for four-dimensional) and performance-based operation (in this connection, reference can be made, for example, to Single European Sky ATM Research (SESAR) master plan). In particular, in parallel to modernized procedures for flight planning and clearance management, pilot-controller exchanges will benefit from the availability of multiple air-ground digital data links for SoL communications, including terrestrial and satellite technologies in ICAO-compliant and ITU-regulated AMS(R)S frequency bands (where, as is known, AMS(R)S stands for Aeronautical Mobile-Satellite (R) Service, (R) being the abbreviation for route flights (route)). In this respect, it is worth recalling that, according to Article 1.36 in Section IV—Radio Stations and Systems—of the ITU Radio Regulations, AMS(R)S is defined as "An aeronautical mobile-satellite service reserved for communications relating to safety and regularity of flights, primarily along national or international civil air routes".

In this new scenario, the new ATM end-to-end operational procedures will result in the management of a dynamic context with ad-hoc performance-oriented provisioning of communications services and bearers.

Currently, known examples of technologies for aeronautical communications are provided in:
  EP 2 023 685 A1, which discloses a method for routing aircraft data link messages over a plurality of communications networks; in particular, said method assigns at least one data link message routing service for an aircraft having a first message processing application based on prescribed criteria, the prescribed criteria comprising preferred networks of the plurality of communications networks; as a first preferred communications network becomes available, the method selects a first message route from the assigned routing service and transmits each of the data link messages on the first message route while the first message route satisfies the prescribed criteria; when the prescribed criteria changes over a plurality of flight phases of the aircraft, the method reassigns the at least one data link message route to continue data link message transmissions to and from the aircraft based on the latest prescribed criteria;
  EP 1 995 706 A2, which discloses systems and methods for actively seeking and generating real-time, conflict-checked, operationally preferred flight trajectory revision recommendations; in particular, the system analyzes air traffic conditions based on a plurality of inputs and includes: an analysis component configured to produce at least one conflict-checked, operationally preferred flight trajectory revision for an operating vehicle, and a communications component configured to communicate the at least one conflict-checked flight trajectory revision; in one embodiment, the system interfaces with the airspace user's operations center (e.g., Airline Operations Center), to communicate the operationally preferred flight trajectory revision, allow the operator to make the decision whether to implement, and request the same from an Air Navigation Service Provider;

EP 2 109 087 A2, which discloses a method for accessing data link communications for an aircraft; in particular, the method comprises providing a pre-selected data link service provider for aircraft communications, detecting a data link service provider supplying Air Traffic Control (ATC) communication services, and determining whether the detected data link service provider is the same as the pre-selected data link service provider; if the detected data link service provider is not the same as the pre-selected data link service provider, a communication link is established with the detected data link service provider for ATC messages, while a communication link is maintained with the pre-selected data link service provider for non-ATC messages; if the detected data link service provider is the same as the pre-selected data link service provider, a communication link is maintained with the pre-selected data link service provider for both ATC messages and non-ATC messages;

EP 2 667 363 A1, which discloses a method of detecting conflicts between aircraft passing through managed airspaces, and to resolving the detected conflicts strategically; in particular, an ATC apparatus according to EP 2 667 363 A1, that is arranged to manage an airspace through which aircraft are flying, comprises processing means configured to receive aircraft intent data describing an aircraft's intended flight path, to launch a conflict detection procedure in which it computes a user-preferred trajectory for each of the aircraft based on the aircraft intent and determines whether any conflicts will arise, to launch a conflict resolution procedure in which it calculates revisions of the aircraft intent of the conflicted aircraft to remove the conflict, and to transmit to the aircraft the revised aircraft intent data;

EP 2 889 579 A1, which discloses a system and method for defining and predicting aircraft trajectories; in particular, the method comprises: acquiring input data of both aircraft performance characteristics and atmospheric data, and defining trajectory parameters to which the aircraft trajectory must be subjected; moreover, the method further comprises: defining aircraft trajectory parameters, acquiring a plurality of atmospheric forecast ensembles, calculating a predicted trajectory from each atmospheric forecast of an atmospheric forecast ensemble, said predicted trajectory having associated information regarding a certain figure of merit of the aircraft trajectory, wherein an ensemble of predicted trajectories is obtained from each atmospheric forecast ensemble, each predicted trajectory of the ensemble of predicted trajectories having an associated probability derived from the probability of each atmospheric forecast within an atmospheric forecast ensemble;

WO 2007/064733 A1, which discloses systems and methods for automatically transferring control from one ATC center that uses one ATC data link standard to another ATC center that uses a different ATC data link standard; in particular, in one embodiment, the system includes: a receiver component configured to receive at least a new ATC center designation message from an original ATC center through an active connection, an identifier component configured to determine a data link standard of a new ATC center from the message, a logon component to log the aircraft into the new ATC center; moreover, the system further includes: a connection component to establish an inactive connection with the new ATC center, a confirmation component to confirm the inactive connection, and a switch component to terminate the active connection and activate the inactive connection;

US 2002/0133294 A1, which discloses a method and apparatus to provide coordinated evasive maneuver commands to an aircraft to avoid collisions; more specifically, US 2002/0133294 A1 discloses a GPS system to determine the location of the aircraft, and a control logic to calculate evasive maneuvers, display aircraft tracking information, coordinate the evasive maneuver with an intruding aircraft, and give a synthetic voice warning and command to the pilots;

US 2006/0178141 A1, which discloses a system and method for the adaptive control of VHF communications in aircraft; in particular, in one embodiment, an adaptive communications system for an aircraft has a communications processor that accesses a communications switching model to select a preferred ground communications station; in another embodiment, a method of communication between an aircraft and a ground station includes: receiving a communications switching model, determining a flight parameter for the aircraft as the aircraft navigates along a flight route, and selecting a ground station based upon the determined flight parameter; the aircraft then communicates with the selected ground station; in still another embodiment, a method for compiling a communications switching model includes receiving signals from a ground station and measuring a signal strength; a preferred ground station is selected based upon the measured signal strength value;

US 2009/0070123 A1, which discloses a method for facilitating a financial decision for 4D navigation of a vehicle; in particular, according to US 2009/0070123 A1, navigation information are received, a current location of the vehicle is determined, data associated with at least one predetermined location of a plurality of predetermined locations is retrieved, a range of costs for said vehicle, representative of the at least one predetermined arrival time for the at least one predetermined location, is estimated, the range of costs is associated with a minimum value of the navigational information and a maximum value of the navigational information, and an indicator representative of at least one cost of the range of costs is displayed;

US 2011/0133980 A1, which discloses systems and methods for integrated ATC management; in particular, in one embodiment, a system comprises:
  a first processing system including a Future Air Navigation System (FANS) application for implementing a Controller-Pilot Data Link Communications (CPDLC) and Aircraft Facility Notification (AFN) system,
  a second processing system including an ATN application for implementing a Protected Mode CPDLC (PM-CPDLC) and Context Management (CM) system, a third processing system implementing a Human Machine Interface (HMI) configured to provide access to a first set of pages driven by the FANS application and a second set of pages driven by the ATN application, and an ATC manager accessed from the HMI, wherein the HMI is further configured to provide access to a third set of pages driven by the ATC manager, wherein the third set of pages selectively directs a user of the HMI to either the first set of pages or the second set of pages based on a selected ATC center;

US 2014/0003335 A1, which relates to a stateful connectionless overlay protocol for information transfer across multiple data links and, in particular, describes a method that reduces the overall transmission time of the information to a destination by simultaneously sending different segments of the information over a plurality of data connections; more in detail, the method comprises presenting information content for transmission to a destination entity, and simultaneously sending different segments of the information over a plurality of data link connections; all segments of the information are received from the plurality of data link connections at the destination entity, and the data segments are reconstructed back into the information content at the destination entity; and U.S. Pat. No. 7,495,602 B2, which discloses systems and methods for communication using a plurality of data link standards through a common ATC operator interface; in particular, in one embodiment, a system includes components configured to select and establish communication with an ATC center using one of a plurality of data link standards; the system further includes components configured to format at least one downlink page to only allow appropriate data inputs based on one or more functionalities of the data link standard, and encode one or more entered data inputs based on the selected data link standard and transmit the inputs to the ATC center; in a particular embodiment, the system further includes components configured to receive and display each of the decoded uplink data transmission in a text message on a corresponding uplink display page according to one or more message text conventions of the selected data link standard.

OBJECT AND SUMMARY OF THE INVENTION

As is known, Required Communication Performance (RCP) types establish required objective performance of end-to-end operational communication services in the various phases of flight, wherein an RCP is a prescribed set of values for communication transaction time, continuity, availability and integrity. In particular, a topic that is part of the ICAO's Manual on RCP is the monitoring and analysis of the actual performance of each provided end-to-end operational communication service including compliance statement and enforcement.

In this context, a first object of the present invention is that of providing a method and related systems which comply with 4D-trajectory-based and performance-based model targeted by ATM roadmap and which allow to adapt and optimize the performance of aeronautical applications, such as CPDLC and Automatic Dependent Surveillance—Contract (ADS-C), provided through digital air-ground SoL data links.

Additionally, a second object of the present invention is that of providing a method and related systems which allow to increase capacity and safety of aeronautical SoL services and data links.

These and other objects are achieved by the present invention in that it relates to a method and related systems, as defined in the appended claims.

In particular, the method according to the present invention comprises:

a) receiving quality measurement data indicative of a quality parameter measured for an aeronautical safety-critical service or data link used by an aircraft;

b) receiving a four-dimensional position associated with the quality measurement data, wherein said four-dimensional position includes a three-dimensional space position and a corresponding time that are computed based on a Global Navigation Satellite System, and related to the measured quality parameter;

c) tagging the quality measurement data with the associated four-dimensional position;

d) determining, on the basis of the tagged quality measurement data and of a predefined task policy, a task to be performed, which task includes an adaptation of the aeronautical safety-critical service used by the aircraft or resources allocated to the aeronautical safety-critical data link used by the aircraft, wherein said adaptation is based on said tagged quality measurement data; and e) performing the determined task.

BRIEF DESCRIPTION OF THE DRAWINGS

For a better understanding of the present invention, preferred embodiments, which are intended purely by way of example and are not to be construed as limiting, will now be described with reference to the attached drawings (not to scale), where.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown and described, but is to be accorded the widest scope consistent with the principles and features disclosed herein and defined in the appended claims.

The present invention concerns a method for managing aeronautical safety-critical services or data links, which method comprises:

a) receiving quality measurement data indicative of a quality parameter measured for an aeronautical safety-critical service or data link used by an aircraft;

b) receiving a four-dimensional position associated with the quality measurement data, wherein said four-dimensional position includes a three-dimensional space position and a corresponding time that are
- computed based on a Global Navigation Satellite System, and
- related to the measured quality parameter;

c) tagging the quality measurement data with the associated four-dimensional position;

d) determining, on the basis of the tagged quality measurement data and of a predefined task policy, a task to be performed, which task includes an adaptation of
- the aeronautical safety-critical service used by the aircraft or
- resources allocated to the aeronautical safety-critical data link used by the aircraft,
wherein said adaptation is based on said tagged quality measurement data; and e) performing the determined task.

Preferably, the determined task to be performed includes:
- said adaptation, or
- a transmission of aircraft tracking data related to the aeronautical safety-critical service or data link used by the aircraft.

More preferably, the determined task to be performed includes:
- said adaptation, or
- said transmission, or
- a change in quality parameter measuring.

More and more preferably, the determined task to be performed includes:
- said adaptation, or
- said transmission, or
- said change in quality parameter measuring, or
- discarding or ignoring the tagged quality measurement data.

Conveniently, the method comprises:
- performing the steps a), b) and c) by a first apparatus;
- indentifying, by the first apparatus, a second apparatus to which the tagged quality measurement data are to be sent;
- sending the tagged quality measurement data from the first apparatus to said second apparatus;
- checking, by said second apparatus, whether the tagged quality measurement data are received from an associated and authenticated source;
- if the tagged quality measurement data are not received from an associated and authenticated source, discarding, by said second apparatus, the tagged quality measurement data;
- if the tagged quality measurement data are received from an associated and authenticated source, deciding, by said second apparatus, on the basis of the predefined task policy, to
  - perform the step d) by said second apparatus, or
  - forward the tagged quality measurement data from said second apparatus to a third apparatus, thereby charging the latter with performing said step d).

More conveniently, the second apparatus:
- is coupled to
  - a first database storing association and authentication data, and
  - a second database storing data indicative of the predefined task policy;
- checks whether the tagged quality measurement data are received from an associated and authenticated source on the basis of the association and authentication data stored on the first database; and
- decides whether to perform the step d) or forward the tagged quality measurement data to the third apparatus on the basis of the data stored on the second database.

More and more conveniently, the determined task to be performed includes:
- said adaptation, or
- said transmission, or
- said change in quality parameter measuring, or
- an update/modification of the association and authentication data stored on the first database.

Therefore, in view of the foregoing, the present invention concerns a method and related systems for increasing capacity and safety of aeronautical SoL communications via a dynamic adaptation of used/provided aeronautical SoL services and/or of allocated communication resources of used aeronautical SoL data links. In particular, the present invention can be advantageously exploited for manned and unmanned/remotely piloted aircraft.

Figure 1:
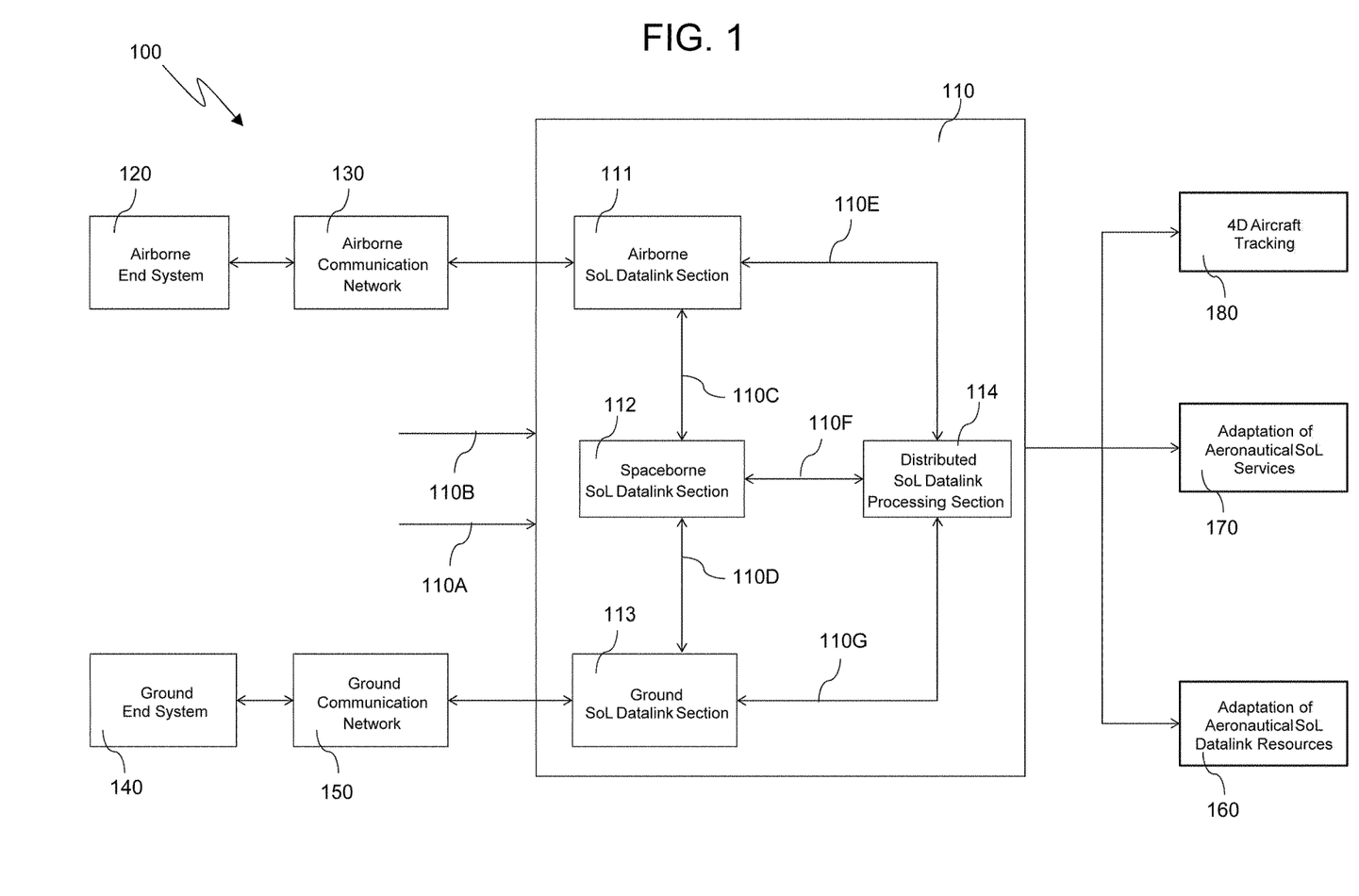
FIG. 1 schematically illustrates an example of aeronautical end-to-end communication system exploiting the present invention.

For a better understanding of the present invention, FIG. 1 schematically illustrates a functional architecture of a non-limitative example of an end-to-end communication system (denoted as whole by 100) for aeronautical applications (such as CPDLC and ADS-C) exploiting the present invention.

In particular, as shown in FIG. 1, the end-to-end communication system 100 comprises:
- a distributed air-ground SoL datalink system 110;
- an airborne end system 120 installed on board aircraft (not shown in FIG. 1) and configured to communicate with the distributed air-ground SoL datalink system 110 via an airborne communication network 130; and
- a ground end system 140 configured to communicate with the distributed air-ground SoL datalink system 110 via a ground communication network 150.

Moreover, the distributed air-ground SoL datalink system 110 includes:
- an airborne SoL datalink section 111 (conveniently comprising a plurality of aircraft including the aircraft equipped with the airborne end system 120);
- a spaceborne SoL datalink section 112 (conveniently including one or more satellites);
- a ground SoL datalink section 113 (conveniently comprising a plurality of ground stations including the ground end system 140); and
- a distributed SoL datalink processing section 114 (conveniently including a plurality of ground and/or airborne and/or spaceborne processing units).

In particular, the distributed air-ground SoL datalink system 110 receives aeronautical SoL datalink quality measurements (arrow denoted in FIG. 1 by 110A) and 4D (space and time) positions associated with said aeronautical SoL datalink quality measurements (arrow denoted in FIG. 1 by 110B), namely three-dimensional (3D) space positions and associated times that:
- are computed by aircraft (in particular, by on-board navigation devices of the aircraft including the aircraft equipped with the airborne end system 120) on the basis of signals received from a Global Navigation Satellite System (GNSS); and
- indicate where and when the aeronautical SoL datalink quality measurements have been performed by said aircraft (in particular, by on-board SoL communications systems of said aircraft including the airborne end system 120).

Moreover, within the distributed air-ground SoL datalink system 110, bidirectional communications and data exchanges are performed between:

the airborne SoL datalink section 111 and the spaceborne SoL datalink section 112 (bidirectional arrow denoted in FIG. 1 by 110C);

the spaceborne SoL datalink section 112 and the ground SoL datalink section 113 (bidirectional arrow denoted in FIG. 1 by 110D); and said airborne, spaceborne and ground SoL datalink sections 111, 112 and 113 and the distributed SoL datalink processing section 114 (bidirectional arrows denoted in FIG. 1 by 110E, 110F and 110G, respectively).

In particular, the distributed SoL datalink processing section 114:

receives from the airborne, spaceborne and ground SoL datalink sections 111, 112 and 113 the aeronautical SoL datalink quality measurements and the associated 4D positions;

takes decisions based thereon by determining corresponding tasks to be performed; and informs said airborne, spaceborne and ground SoL datalink sections 111, 112 and 113 of the tasks to be performed, wherein the aircraft (in particular, the respective on-board SoL communications systems) and the ground stations, which are using the aeronautical SoL datalinks and/or services involved by the decisions taken by the distributed SoL datalink processing section 114, perform the corresponding tasks determined by said distributed SoL datalink processing section 114.

More in detail, the tasks to be performed that can be determined by the distributed SoL datalink processing section 114 can conveniently include:

an adaptation of the aeronautical SoL datalink resources (block 160 in FIG. 1); and/or an adaptation of the aeronautical SoL services (block 170 in FIG. 1).

Additionally, the distributed SoL datalink processing section 114 may conveniently request also an adaptation of 4D aircraft tracking surveillance method (block 180 in FIG. 1) to track anomalies in the SoL datalink configuration with respect to datalink service provisioning needs and constraints.

By adapting provisioning of aeronautical SoL services to 4D-tagged SoL datalink quality measurements, SoL datalink efficiency and, thence, capacity improve, without detriment to safety. For example, it is possible to save communication resources for an aircraft flying in an airspace with stable weather conditions not requiring frequent updates of weather maps.

By adapting aeronautical SoL datalink resource allocation to relevant quality measurements, SoL service provisioning and, thence, safety improve, without detriment to capacity. For example, it is possible to allocate datalink resources to increase SoL services provisioning for an aircraft flying in a bad weather airspace or experiencing anomalous flight conditions.

By adapting the emission of 4D aircraft tracking signals to the SoL datalink conditions, surveillance applications become proactive with respect to SoL datalink underperformance events.

It is worth noting that the present invention can conveniently exploit any datalink quality measurement methodology (such as methodologies based on computation of Bit Error Rates (BERs), Signal-to-Noise Ratios (SNRs), etc.), and any GNSS (such as the Global Positioning System (GPS), Galileo and/or GLONASS) and/or Satellite Based Augmentation System (SBAS) (such as the European Geostationary Navigation Overlay Service (EGNOS), the Wide Area Augmentation System (WAAS) and/or the Multi-functional Satellite Augmentation System (MSAS)).

Figure 2:
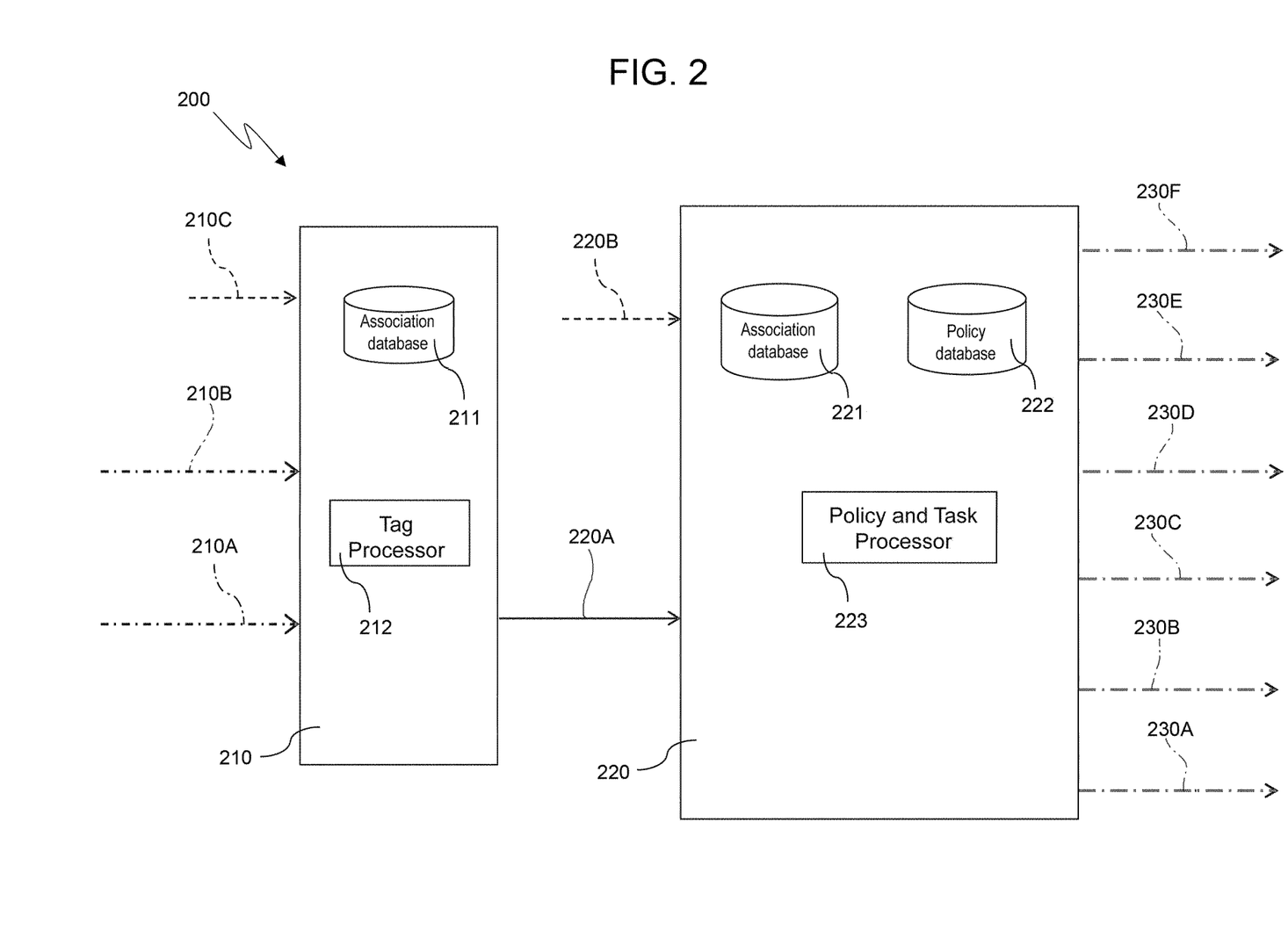
FIG. 2 schematically illustrates a system according to a preferred embodiment of the present invention.

FIG. 2 schematically illustrates a system (denoted as a whole by 200) according to a preferred embodiment of the present invention.

In particular, as shown in FIG. 2, the system 200 includes:

a first apparatus 210 comprising a first input interface 210A, a second input interface 210B, a first association database 211 and a tag processor 212; and a second apparatus 220 comprising a third input interface 220A, a second association database 221, a policy database 222, a policy and task processor 223, a first output interface 230A, a second output interface 230B, a third output interface 230C, a fourth output interface 230D, a fifth output interface 230E, and a sixth output interface 230F.

More in detail, the first apparatus 210 is configured to receive aeronautical SoL datalink quality measurements through the first input interface 210A and associated GNSS-based 4D positions through the second input interface 210B, and the tag processor 212 is configured to:

tag the aeronautical SoL datalink quality measurements received through the first input interface 210A with the associated GNSS-based 4D positions received through the second input interface 210B;

retrieve from the first association database 211 an identity of an associated, authenticated apparatus to which said aeronautical SoL datalink quality measurements tagged with the associated GNSS-based 4D positions are to be sent (in the example shown in FIG. 2 said associated authenticated apparatus being the second apparatus 220); and provide the second apparatus 220 with the aeronautical SoL datalink quality measurements tagged with the associated GNSS-based 4D positions through the third input interface 220A.

Conveniently, the tag processor 212 may operate by performing any predefined mathematical processing function, such as functions ranging from simple concatenation to more elaborated hash functions like those used for fingerprinting. The choice of the function to be used can be conveniently made by taking into consideration several parameters, such as affordable cost, complexity, overhead of the transmitted information on the SoL data link, processing delay, etc.

Moreover, the policy and task processor 223 is configured to:

check in the second association database 221 whether the aeronautical SoL datalink quality measurements tagged with the associated GNSS-based 4D positions received through the third input interface 220A are actually received from a properly associated and authenticated source; and, if the aeronautical SoL datalink quality measurements tagged with the associated GNSS-based 4D positions are actually received from a properly associated and authenticated source, determine a task to be performed on the basis of the policy database 222 and said received aeronautical SoL datalink quality measurements tagged with the associated GNSS-based 4D positions.

Figure 3:
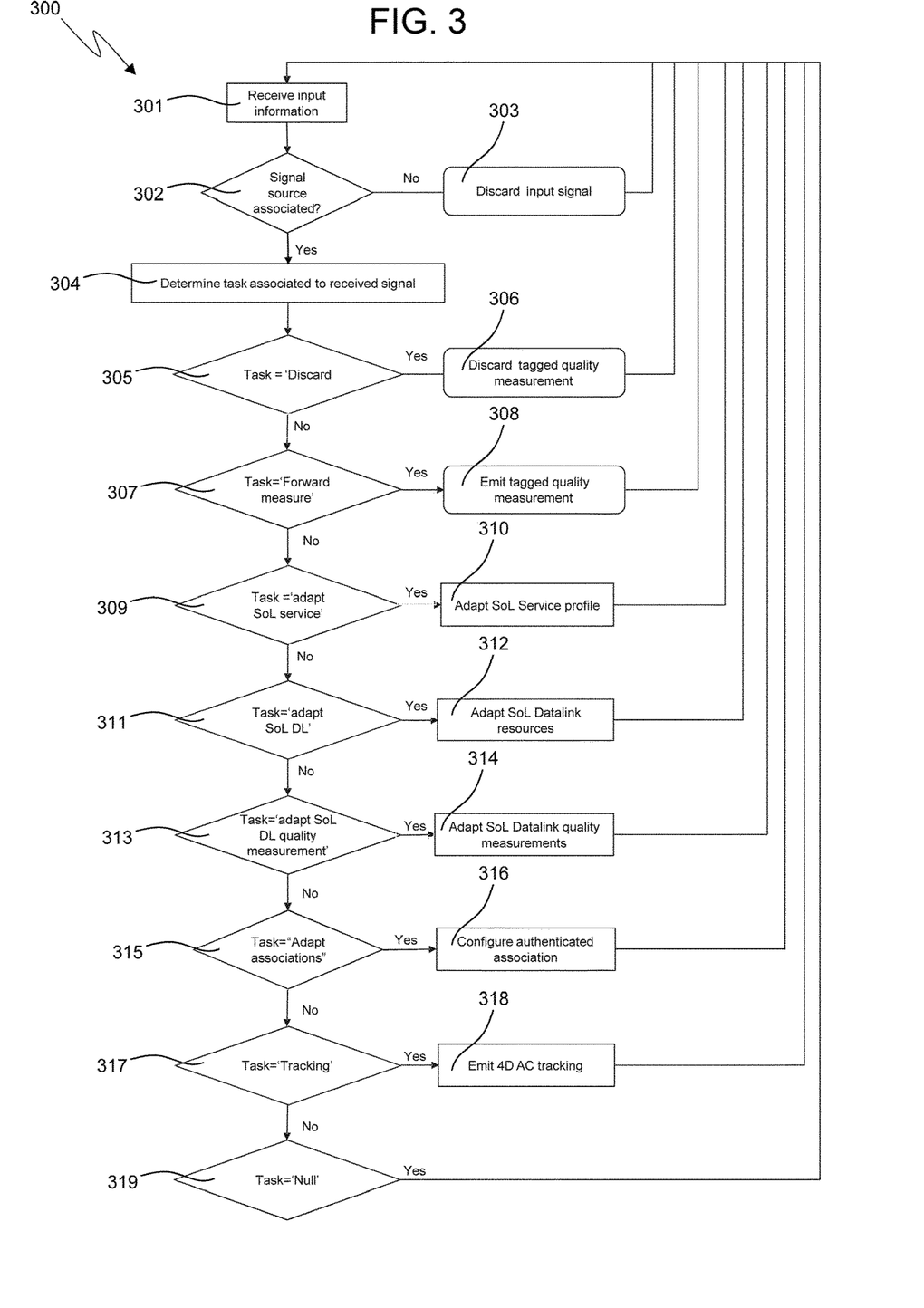
FIG. 3 schematically illustrates an example of logic implemented by a component of the system of FIG. 2.

In this connection, FIG. 3 shows a flow chart schematically representing an example of logic implemented by the policy and task processor 223.

In particular, as shown in FIG. 3, the policy and task processor 223 is conveniently configured to:
- receive the aeronautical SoL datalink quality measurements tagged with the associated GNSS-based 4D positions through the third input interface 220A (block 301);
- if it determines, on the basis of the second association database 221, that the received aeronautical SoL datalink quality measurements tagged with the associated GNSS-based 4D positions are not received from an associated or authenticated source (block 302), discard said tagged aeronautical SoL datalink quality measurements (block 303);
- otherwise determine a task to be performed (block 304).

Moreover, again as shown in FIG. 3, the policy and task processor 223 is conveniently configured to determine the task to be performed in the following way:
- discarding the received aeronautical SoL datalink quality measurements tagged with the associated GNSS-based 4D positions (block 306) if it determines so on the basis of the policy database 222 (block 305); otherwise
- forwarding the received aeronautical SoL datalink quality measurements tagged with the associated GNSS-based 4D positions to a remote policy and task processor through the first output interface 230A (block 308) if it determines so on the basis of the policy database 222 (block 307), thereby charging another system element with defining the task to be performed (for example, in a distributed ATM communications adaptation architecture); otherwise
- requesting a "local" adaptation of aeronautical SoL service through the second output interface 230B (block 310) if it determines so on the basis of the policy database 222 and of the received aeronautical SoL datalink quality measurements tagged with the associated GNSS-based 4D positions (block 309), thereby modifying the provisioning configuration of, for example, CPDLC, ADS-C, or other aeronautical SoL service(s); otherwise
- requesting a "local" adaptation of aeronautical SoL datalink resource allocation through the third output interface 230C (block 312) if it determines so on the basis of the policy database 222 and of the received aeronautical SoL datalink quality measurements tagged with the associated GNSS-based 4D positions (block 311), thereby modifying the resources previously assigned to the aeronautical SoL data link currently used; otherwise
- requesting an adaptation of the configuration of aeronautical SoL datalink quality measurement device(s)/unit(s) through the fourth output interface 230D (block 314) if it determines so on the basis of the policy database 222 and of the received aeronautical SoL datalink quality measurements tagged with the associated GNSS-based 4D positions (block 313), thereby modifying the operation of these device(s)/unit(s) (for example, in order to adjust the measurement rate, modify switch-on/switch-off status, etc.); otherwise
- requesting an adaptation of the association status of the first and second apparatuses 210 and 220 and/or remote/local apparatuses through the fifth output interface 230E (block 316) if it determines so on the basis of the policy database 222 and of the received aeronautical SoL datalink quality measurements tagged with the associated GNSS-based 4D positions (block 315), thereby establishing or deleting authenticated associations, for example stored on the second association database 221 (to this end, additional input interfaces 210C and 220B coupled, respectively, to the first apparatus 210 and the second apparatus 220 (as shown in FIG. 2) could be conveniently exploited so as to modify the path of forwarded and processed tagged quality measurements in the overall system 200); otherwise
- requesting emission of 4D aircraft tracking data in addition to 4D-tagged aeronautical SoL datalink quality measurements trough the sixth output interface 230F (block 318) if it determines so on the basis of the policy database 222 and of said received aeronautical SoL datalink quality measurements tagged with the associated GNSS-based 4D positions (block 317), for the purpose of signaling via surveillance application some significant information related to SoL datalink anomalous aspects (such as, insurgence or resolution of anomalies); otherwise
- not performing any task (block 319) until the reception of new aeronautical SoL datalink quality measurements tagged with associated GNSS-based 4D positions.

Therefore, in view of the foregoing, processing of the received aeronautical SoL datalink quality measurements tagged with the associated GNSS-based 4D positions by the policy and task processor 223 can result in said tagged aeronautical SoL datalink quality measurements to be:
- discarded (block 303 or 306);
- forwarded for processing by another apparatus (block 308);
- exploited to determine the adaptation to be performed at SoL service or datalink level (block 310 or 312);
- exploited to determine the configuration to be applied to perform the SoL datalink quality measurements (block 314);
- exploited to determine the type of authentication process to be performed (block 316);
- exploited to perform 4D aircraft tracking related to the used/exploited SoL data link (for example, to signal anomalies thereof) (block 318); or
- ignored (block 319).

Conveniently, for each of the above types of the tasks to be performed, a respective specific signal format can be used on the respective output interface 220A, 220B, 220C, 220D, 220E, and 220F.

Figure 4:
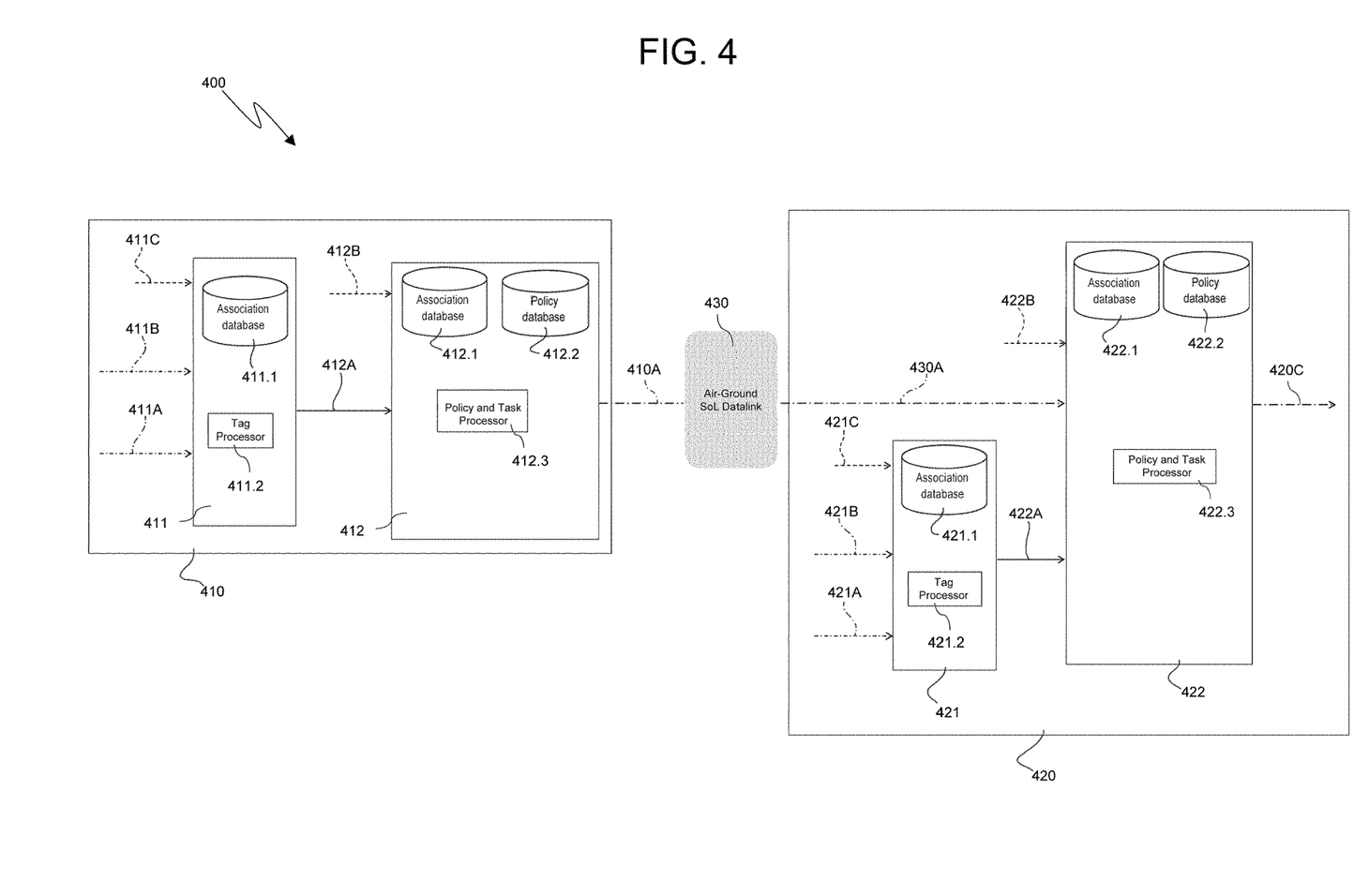
FIGS. 4-7 schematically illustrate examples of systems based on said preferred embodiment of the present invention.

FIG. 4 schematically illustrates a first example of a system (denoted as a whole by 400) based on the aforesaid preferred embodiment of the present invention shown in FIGS. 2 and 3 and previously described.

In particular, in said first example shown in FIG. 4, an airborne system 410 is remotely connected to, and exchanges data with, an associated and authenticated ground system 420 by means of an air-ground SoL data link 430.

In detail, the airborne system 410 comprises:
- a respective first apparatus 411, that includes a respective first input interface 411A, a respective second input interface 411B, a respective first association database 411.1 and a respective tag processor 411.2 that are configured to operate as, respectively, the first input interface 210A, the second input interface 210B, the first association database 211 and the tag processor 212 of the first apparatus 210 of the system 200 shown in FIG. 2 and previously described; and
- a respective second apparatus 412, that includes a respective third input interface 412A, a respective second association database 412.1, a respective policy database 412.2, a respective policy and task processor 412.3 and a respective output interface 410A that are configured to operate as, respectively, the third input interface 220A, the second association database 221, the policy database 222, the policy and task processor 223 and the first output interface 230A of the second apparatus 220 of the system 200 previously described with reference to FIGS. 2 and 3.

Moreover, the ground system 420 comprises:

a respective first apparatus 421, that includes a respective first input interface 421A, a respective second input interface 421B, a respective first association database 421.1 and a respective tag processor 421.2 that are configured to operate as, respectively, the first input interface 210A, the second input interface 210B, the first association database 211 and the tag processor 212 of the first apparatus 210 of the system 200 shown in FIG. 2 and previously described; and a respective second apparatus 422, that includes a respective third input interface 422A, a respective second association database 422.1, a respective policy database 422.2, a respective policy and task processor 422.3 and a respective output interface 420C that are configured to operate as, respectively, the third input interface 220A, the second association database 221, the policy database 222, the policy and task processor 223 and the third output interface 230C of the second apparatus 220 of the system 200 previously described with reference to FIGS. 2 and 3.

More in detail, in said first example shown in FIG. 4, the tag processor 411.2 of the airborne system 410 receives the SoL datalink quality measurements via the respective first input interface 411A and the 4D positions via the respective second input interface 411B, and provides the tagged SoL datalink quality measurements via the respective third input interface 412A; then, the respective policy and task processor 412.3 determines, on the basis of the tagged SoL datalink quality measurements received and of data stored on the respective policy database 412.2, the task to be performed (as previously described in connection with FIG. 3). Specifically, in said first example shown in FIG. 4, the determined task to be performed is the forwarding of the tagged SoL datalink quality measurements via the respective output interface 410A and the air-ground SoL data link 430, thereby providing the ground system 420 with said tagged SoL datalink quality measurements. Then, the policy and task processor 422.3 of said ground system 420 determines, on the basis of the tagged SoL datalink quality measurements received and of data stored on the respective policy database 422.2, that an adaptation of SoL datalink resource allocation is required to better correspond to current service provisioning profile and, thence, starts the corresponding process by emitting an output signal via the respective output interface 420C (this output signal does not pass through the air-ground SoL data link 430 because it is directed towards ground entities (i.e., ground stations) involved in the process).

Figure 5:
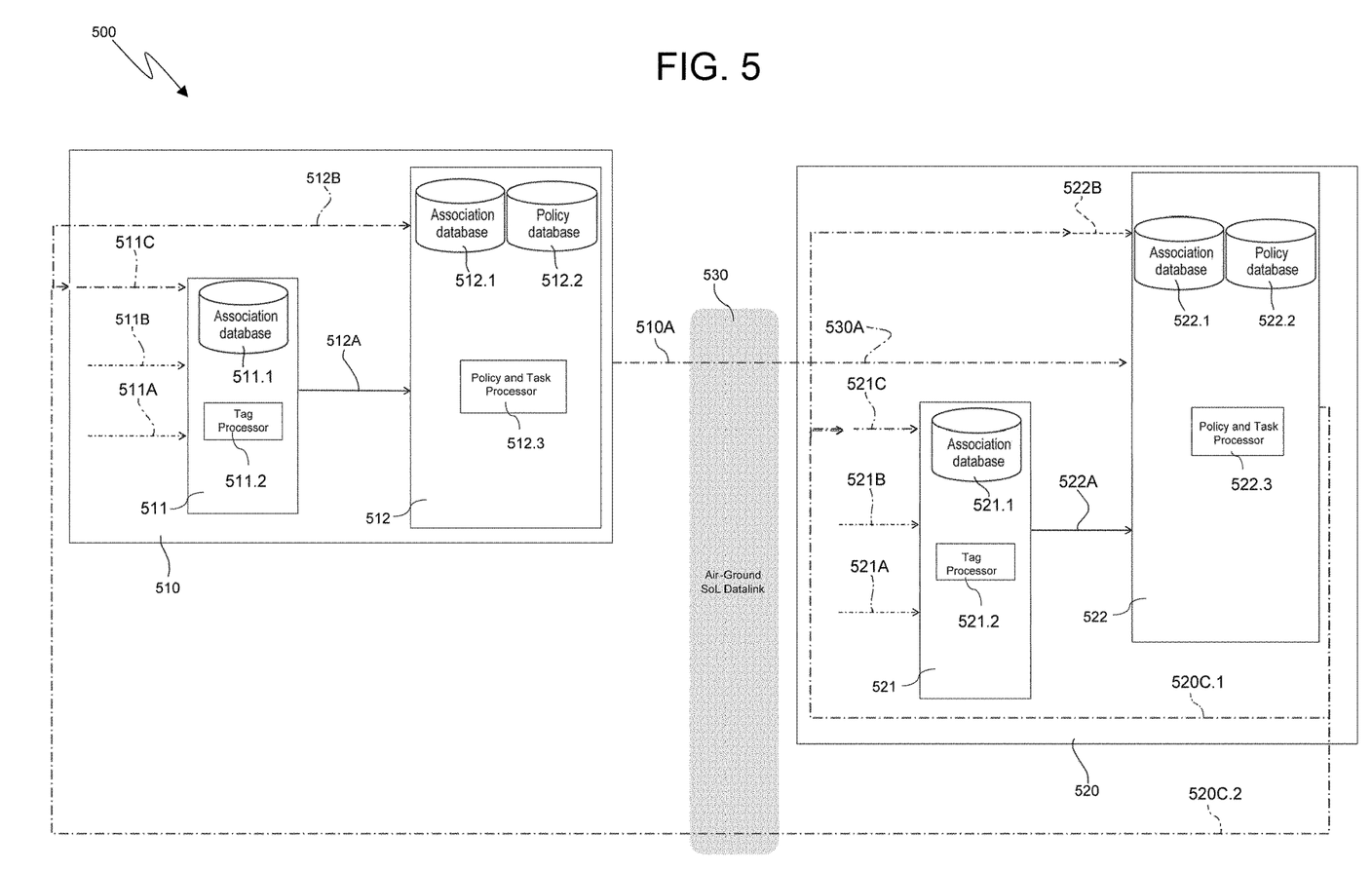

Moreover, FIG. 5 schematically illustrates a second example of a system (denoted as a whole by 500) based on the aforesaid preferred embodiment of the present invention shown in FIGS. 2 and 3 and previously described.

In particular, in said second example shown in FIG. 5, an airborne system 510 is remotely connected to, and exchanges data with, a ground system 520 by means of an air-ground SoL data link 530, wherein said airborne system 510 and said ground system 520 include the same components as the system 200 shown in FIG. 2, and operate according to what shown in FIGS. 2 and 3 and previously described about said system 200.

In detail, in said second example shown in FIG. 5, a policy and task processor 522.3 of the ground system 520 determines the need to clear the authenticated association status with an aircraft and consequently emits a corresponding signal via:

a respective first output interface 520C.1 towards respective first and second association databases 521.1 and 522.1 of said ground system 520; and a respective second output interface 520C.2 towards first and second association databases 511.1 and 512.1 of the airborne system 510.

This process can be advantageously used to manage authenticated associations as part of handover sequences, in order to enable/disable measurement and task delivery between peered/unpeered apparatus.

Figure 6:
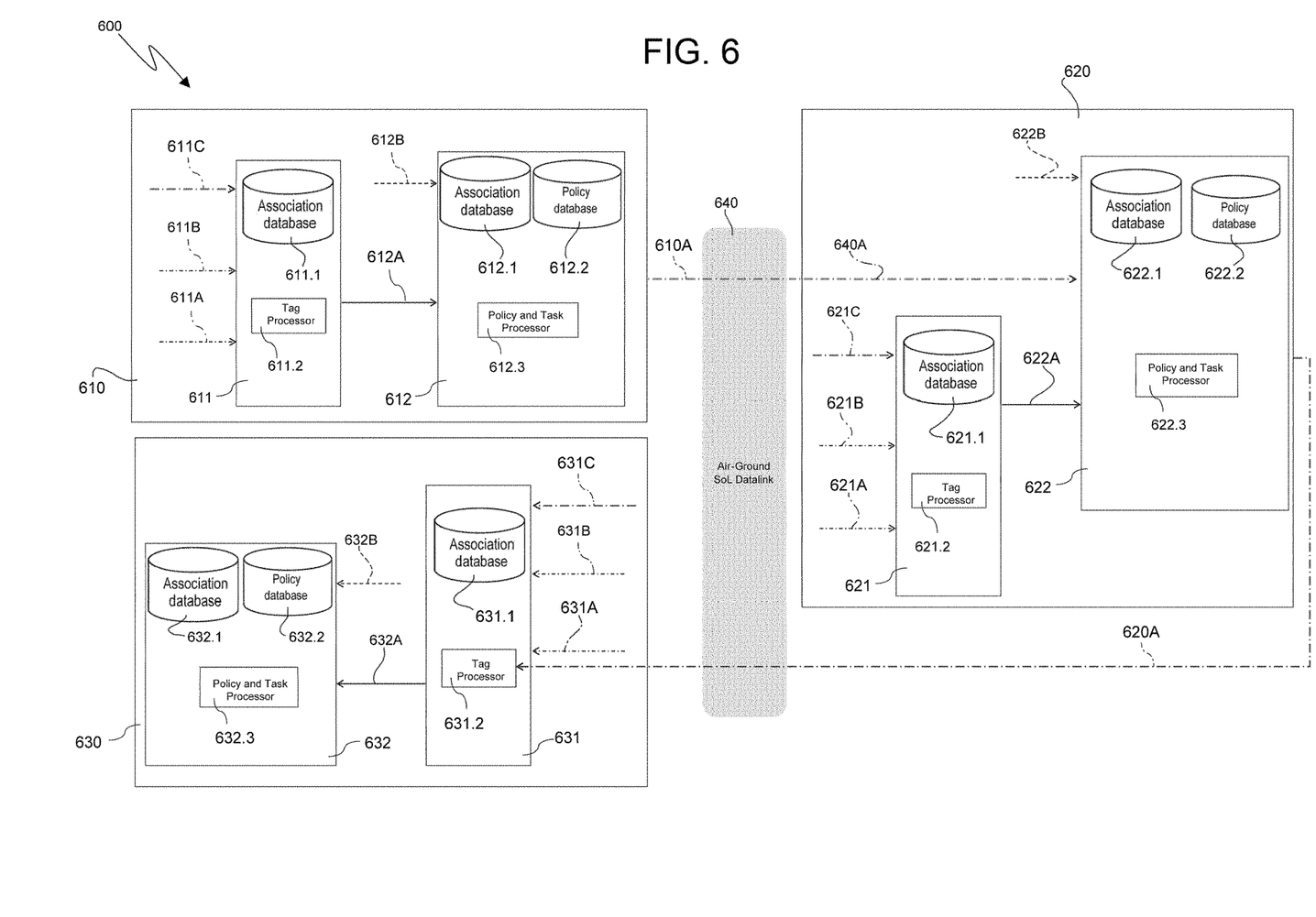

Furthermore, FIG. 6 schematically illustrates a third example of a system (denoted as a whole by 600) based on the aforesaid preferred embodiment of the present invention shown in FIGS. 2 and 3 and previously described.

In particular, in said third example shown in FIG. 6, an airborne system 610 communicates with a remote ground system 630 by means of an air-ground SoL data link 640 and via a spaceborne system 620 (in particular, installed on board a satellite), wherein said airborne system 610, said spaceborne system 620 and said ground system 630 include the same components as the system 200 shown in FIG. 2, and operate according to what shown in FIGS. 2 and 3 and previously described about said system 200.

In detail, in said third example shown in FIG. 6, also the spaceborne system 620 provides respective tagged SoL datalink quality measurements to the ground system 630 in addition to those provided by the airborne system 610, so as to better support the central processing role of said ground system 630.

Figure 7:
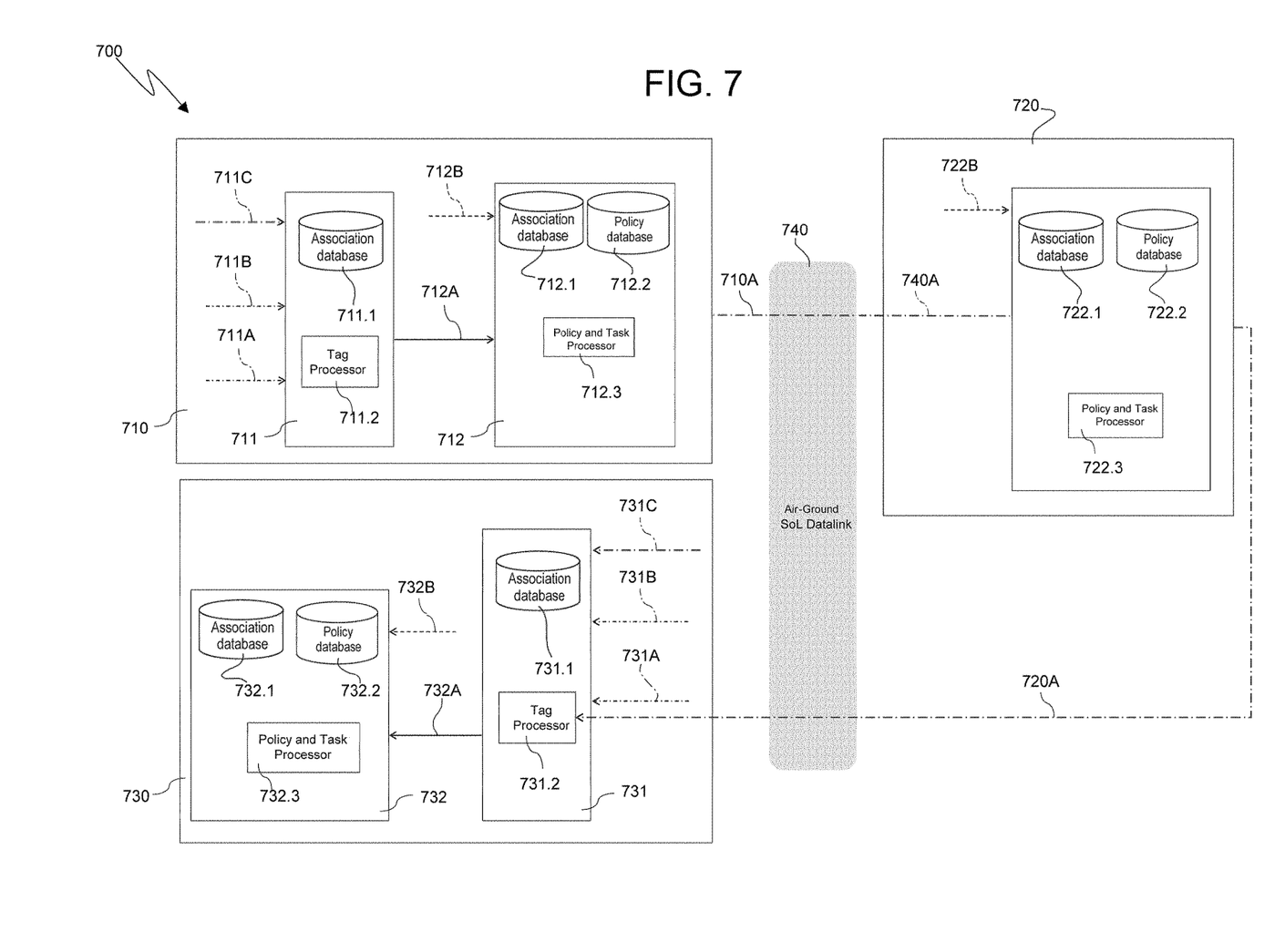

Additionally, FIG. 7 schematically illustrates a fourth example of a system (denoted as a whole by 700) based on the aforesaid preferred embodiment of the present invention shown in FIGS. 2 and 3 and previously described.

In particular, in said fourth example shown in FIG. 7, an airborne system 710 communicates with a remote ground system 730 by means of an air-ground SoL data link 740 and via a spaceborne system 720 (in particular, installed on board a satellite), wherein said airborne system 710, said spaceborne system 720 and said ground system 730 operate according to what shown in FIGS. 2 and 3 and previously described about the system 200.

In detail, in said fourth example shown in FIG. 7, the spaceborne system 720 includes only a respective policy and task processor 722.3 (along with related association database 722.1 and policy database 722.2), while it does not include any respective tag processor, thereby resulting in said spaceborne system 720 not being designed to provide satellite measurements of SoL datalink quality. Specifically, in said fourth example shown in FIG. 7, the spaceborne system 720 is limited to forwarding to the ground system 730 the tagged SoL datalink quality measurements received from the airborne system 710.

The advantages of the present invention are clear from the foregoing.

In particular, it is worth highlighting the fact that the present invention:

allows to increase capacity and safety of aeronautical SoL services and data links;

provides a scalable and modular infrastructure for aeronautical SoL communications by means of adaptation of service profile, adaptation of allocated datalink resources and adaptation of 4D aircraft tracking exchanges based on the ongoing transactions and overall status of the end-to-end communication system;

is operable with any digital SoL datalink and GNSS positioning, navigation and timing technology;

is secure against unauthorized intrusions through the definition of authenticated communication interface to improve robustness against intrusions and eavesdropping; and can be advantageously exploited to increase also airspace and airport capacity performance.

Finally, it is clear that numerous modifications and variants can be made to the present invention, all falling within the scope of the invention, as defined in the appended claims.

The invention claimed is:

1. Method for managing air-ground Safety-of-Life services or data links provided by a distributed air-ground Safety-of-Life datalink system, wherein said distributed air-ground Safety-of-Life datalink system includes:
   a ground system;
   a plurality of aircraft equipped, each, with an airborne system designed to be remotely connected to, and exchange data with, the ground system by means of an air-ground Safety-of-Life data link; and
   one or more satellites, each equipped with a spaceborne system via which the airborne system is operable to be remotely connected to, and exchange data with, the ground system by means of the air-ground Safety-of-Life data links;
the method being characterized by comprising equipping:
   each ground and airborne system with a respective first apparatus and a respective second apparatus; and
   a spaceborne system with a respective first apparatus and a respective second apparatus, or only with a respective second apparatus;
wherein each first apparatus includes:
   a respective first association database storing respective first association and authentication data; and
   a respective tag processor;
wherein each second apparatus includes:
   a respective second association database storing respective second association and authentication data;
   a respective policy database storing data indicative of a respective predefined task policy; and
   a respective policy and task processor;
wherein the method further comprises performing the following steps by means of a tag processor:
   a) receiving quality measurement data indicative of a quality parameter measured for the air-ground Safety-of-Life service or data link used by an aircraft, along with a four-dimensional position associated with said quality measurement data, wherein said four-dimensional position includes a three-dimensional space position and a corresponding time at which said quality parameter has been measured, wherein said three-dimensional space position and said corresponding time are computed based on a Global Navigation Satellite System;
   b) tagging the quality measurement data with the associated four-dimensional position;
   c) identifying, on the basis of the respective first association and authentication data stored on the respective first association database, the second apparatus to which the tagged quality measurement data are to be sent; and
   d) sending the tagged quality measurement data to the second apparatus identified;
wherein the method further comprises performing the following steps by means of a policy and task processor:
   e) receiving the tagged quality measurement data;
   f) checking whether the received tagged quality measurement data arrive from an associated and authenticated source on the basis of the respective second association and authentication data stored on the respective second association database;
   g1) when the tagged quality measurement data are not received from an associated and authenticated source, discarding said tagged quality measurement data;
   g2) when the tagged quality measurement data are received from an associated and authenticated source, determining a task to be performed based on the tagged quality measurement data received and the respective policy data stored on the respective policy database; and
   h) performing the determined task;
wherein the determined task to be performed includes:
   adapting, based on the tagged quality measurement data, the air-ground Safety-of-Life service used by an aircraft or resources allocated to the air-ground Safety-of-Life data link used by an aircraft;
   or transmitting aircraft tracking data related to the air-ground Safety-of-Life service or data link used by an aircraft;
   or changing quality parameter measuring;
   or discarding/ignoring the tagged quality measurement data;
   or updating/modifying the respective second association and authentication data stored on the respective second association database;
   or forwarding the tagged quality measurement data to a first or second apparatus.

2. System designed to be used in a distributed air-ground Safety-of-Life datalink system, wherein said distributed air-ground Safety-of-Life datalink system includes:
   ground systems;
   an aircraft, each equipped with an airborne system designed to be remotely connected to, and exchange data with, the ground systems by means of an air-ground Safety-of-Life data link; and
   one or more satellites, each equipped with a spaceborne system via which the airborne systems are operable to be remotely connected to, and exchange data with, the ground systems by means of the air-ground Safety-of-Life data links;
the system including an apparatus, that comprises:
   an association database storing association and authentication data;
   a policy database storing data indicative of a predefined task policy; and
   a policy and task processor;
said system being designed to be integrated into the spaceborne system;
and wherein the policy and task processor is configured to carry put the steps e), f), g1), g2) and h) of the method as claimed in claim 1.

3. System designed to be used in a distributed air-ground Safety-of-Life datalink system, wherein said distributed air-ground Safety-of-Life datalink system includes:
   ground systems;

aircraft, each equipped with an airborne system designed to be remotely connected to, and exchange data with, the ground systems by means of an air-ground Safety-of-Life data link; and satellites, each equipped with a spaceborne system via which the airborne systems are operable to be remotely connected to, and exchange data with, the ground systems by means of the air-ground Safety-of-Life data links;

the system including a first apparatus and a second apparatus;

wherein the first apparatus includes:
   a first association database storing first association and authentication data; and
   a tag processor;

wherein the second apparatus includes:
   a second association database storing second association and authentication data;
   a policy database storing data indicative of a predefined task policy; and
   a policy and task processor;

said system being designed to be integrated into the ground, airborne and spaceborne systems;

wherein the tag processor is configured to carry out the steps a), b), c) and d) of the method as claimed in claim 1; and wherein the policy and task processor is configured to carry out the steps e), f), g1), g2) and h) of said method.

4. Aircraft equipped with the system as claimed in claim 3.

5. Air traffic control ground station equipped with the system as claimed in claim 3.

6. Satellite equipped with the system as claimed in claim 3.

\* \* \* \* \*